US012472089B2

United States Patent
Hengeller

(10) Patent No.: US 12,472,089 B2
(45) Date of Patent: Nov. 18, 2025

(54) OSTOMY PRODUCT ADHESIVE SECURING MEMBER

(71) Applicant: Coloplast A/S, Humlebaek (DK)

(72) Inventor: Ludovica Hengeller, Frederiksberg C (DK)

(73) Assignee: Coloplast A/S, Humlebaek (DK)

( * ) Notice: Subject to any disclaimer, the term of this patent is extended or adjusted under 35 U.S.C. 154(b) by 332 days.

(21) Appl. No.: 18/267,793

(22) PCT Filed: Dec. 21, 2021

(86) PCT No.: PCT/DK2021/050380
§ 371 (c)(1),
(2) Date: Jun. 16, 2023

(87) PCT Pub. No.: WO2022/135645
PCT Pub. Date: Jun. 30, 2022

(65) Prior Publication Data
US 2024/0065878 A1 Feb. 29, 2024

(30) Foreign Application Priority Data
Dec. 23, 2020 (DK) .......................... PA 2020 70870

(51) Int. Cl.
A61F 5/443 (2006.01)
A61F 5/445 (2006.01)

(52) U.S. Cl.
CPC .............. A61F 5/443 (2013.01); A61F 5/445 (2013.01)

(58) Field of Classification Search
CPC .................................. A61F 5/443; A61F 5/445
See application file for complete search history.

(56) References Cited

U.S. PATENT DOCUMENTS

| 3,039,464 | A | * | 6/1962 | Esperanza | A61F 5/448 604/344 |
| 3,374,856 | A | * | 3/1968 | Wirt | F24F 13/24 138/144 |
| 3,941,133 | A | | 3/1976 | Chen | |
| 4,137,918 | A | * | 2/1979 | Bogert | A61F 5/445 604/328 |
| 5,704,905 | A | | 1/1998 | Jensen et al. | |
| 5,891,113 | A | * | 4/1999 | Quinn | A61J 15/0061 604/905 |

(Continued)

FOREIGN PATENT DOCUMENTS

| CA | 170698 A | 7/1916 |
| DE | 102014018814 A1 | 6/2016 |

(Continued)

Primary Examiner — Guy K Townsend
(74) Attorney, Agent, or Firm — Coloplast Corp., Coloplast A/S; Nick Baumann

(57) ABSTRACT

An adhesive ostomy product securing member for securing an ostomy base plate to the skin. The securing member comprises a flexible arcuate laminate having a radial inner portion, a radial outer portion, and a proximal adhesive surface for securing the laminate simultaneously to the skin of an ostomate and to an ostomy flange. The radial inner portion has a first thickness, and the radial outer portion is provided with a pattern of discrete zones having a second thickness, the first thickness being smaller than the second thickness.

12 Claims, 1 Drawing Sheet

(56) References Cited

U.S. PATENT DOCUMENTS

| | | | | |
|---|---|---|---|---|
| 6,033,390 A * | 3/2000 | von Dyck | ............... | A61F 5/445 604/174 |
| 6,485,476 B1 * | 11/2002 | von Dyck | ............... | A61F 5/441 604/332 |
| 6,595,971 B1 * | 7/2003 | von Dyck | ........... | A61M 3/0202 604/334 |
| 6,689,111 B2 * | 2/2004 | Mulhauser | ............... | A61F 5/445 604/332 |
| 7,001,367 B2 * | 2/2006 | Arkinstall | ............... | A61F 5/445 604/337 |
| 7,765,007 B2 * | 7/2010 | Martino | ............. | A61N 1/36007 607/40 |
| 8,080,703 B2 | 12/2011 | Marcussen | | |
| 8,105,299 B2 * | 1/2012 | Shah | ....................... | A61F 5/445 604/338 |
| 8,167,859 B2 * | 5/2012 | Shah | ....................... | B29C 66/54 604/382 |
| 8,277,427 B2 | 10/2012 | Edvardsen et al. | | |
| 8,399,732 B2 | 3/2013 | Oelund et al. | | |
| 8,529,429 B2 * | 9/2013 | Gobel | ................... | A61F 2/0013 600/32 |
| 8,821,465 B2 * | 9/2014 | Hanuka | ................ | A61F 5/4407 604/333 |
| D744,090 S * | 11/2015 | Bendix | ........................ | D24/118 |
| D744,091 S * | 11/2015 | Bendix | ........................ | D24/118 |
| D744,092 S * | 11/2015 | Bendix | ........................ | D24/118 |
| 9,186,233 B2 * | 11/2015 | Göbel | ................... | A61F 2/0013 |
| 10,166,138 B2 * | 1/2019 | Cline | ..................... | A61F 5/445 |
| 10,413,440 B2 * | 9/2019 | Moavenian | ............. | A61F 5/443 |
| 10,537,461 B2 * | 1/2020 | Hanuka | ................. | A61F 5/441 |
| 10,864,108 B2 * | 12/2020 | Moavenian | ............. | A61F 5/449 |
| 10,952,890 B2 * | 3/2021 | Hewitt | ................... | A61F 5/4404 |
| 11,166,838 B2 * | 11/2021 | Cline | ..................... | A61F 5/445 |
| 2002/0077611 A1 * | 6/2002 | von Dyck | ............... | A61F 5/442 604/332 |
| 2004/0106908 A1 | 6/2004 | Leise, Jr. et al. | | |
| 2007/0078418 A1 * | 4/2007 | May | ........................ | A61F 5/443 604/336 |
| 2008/0262449 A1 * | 10/2008 | Shah | ................... | B29C 66/1122 604/338 |
| 2010/0174253 A1 * | 7/2010 | Cline | ..................... | A61F 5/445 604/328 |
| 2010/0241092 A1 * | 9/2010 | Nguyen-Demary | ........................ | A61F 5/4407 604/336 |
| 2011/0306823 A1 * | 12/2011 | Gobel | ................... | A61F 2/0013 600/32 |
| 2016/0235582 A1 * | 8/2016 | Moavenian | ............. | A61F 5/448 |
| 2017/0007440 A1 * | 1/2017 | Moavenian | ............. | A61F 5/445 |
| 2017/0143535 A1 * | 5/2017 | Praame | .................. | A61F 5/443 |
| 2018/0055679 A1 * | 3/2018 | Hewitt | ................... | A61F 5/4404 |
| 2019/0133813 A1 * | 5/2019 | Cline | ..................... | A61F 5/445 |
| 2020/0038226 A1 * | 2/2020 | Botten | .................... | A61F 5/451 |
| 2020/0337884 A1 * | 10/2020 | Donovan | ................ | A61F 5/448 |
| 2022/0054297 A1 * | 2/2022 | Cline | ..................... | A61F 5/445 |
| 2024/0065878 A1 * | 2/2024 | Hengeller | ............... | A61F 5/443 |

FOREIGN PATENT DOCUMENTS

| | | | | |
|---|---|---|---|---|
| GB | 2432120 A | | 5/2007 | |
| GB | 2548673 A | * | 9/2017 | ............ A61F 5/443 |
| WO | 2017041807 A1 | | 3/2017 | |
| WO | 2017192669 A1 | | 11/2017 | |
| WO | 2018033413 A1 | | 2/2018 | |
| WO | 2018093891 A2 | | 5/2018 | |
| WO | 2018188706 A1 | | 10/2018 | |

* cited by examiner

OSTOMY PRODUCT ADHESIVE SECURING MEMBER

SUMMARY OF THE INVENTION

The invention relates to an adhesive ostomy product securing member comprising: a flexible arcuate laminate having a radial inner portion, a radial outer portion, and a proximal adhesive surface for securing the laminate simultaneously to the skin of an ostomate and to an ostomy flange.

BRIEF DESCRIPTION OF THE DRAWING

The accompanying drawings are included to provide a further understanding of embodiments and are incorporated into and a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

Figure 1:
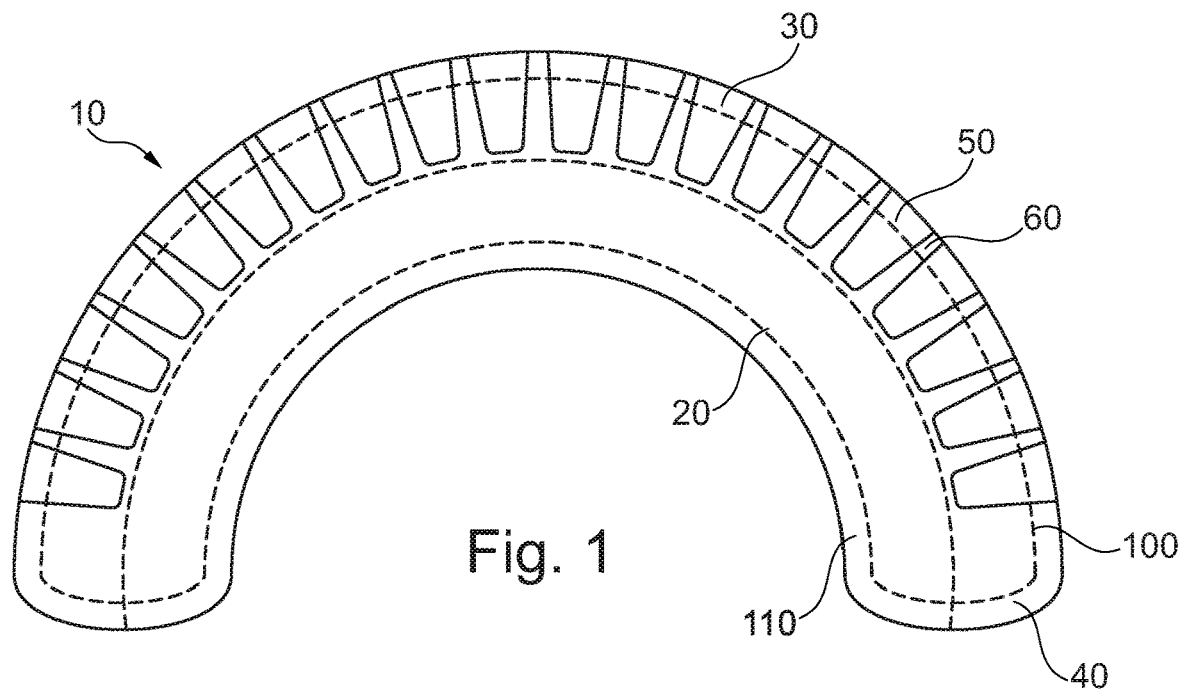
FIG. 1 illustrates an embodiment of the adhesive ostomy product securing member seen from above (distal side)

In the following, whenever referring to proximal side of a device or part of a device, the referral is to the skin-facing side, when the ostomy appliance is worn by a user. Likewise, whenever referring to the distal side of a device or part of a device, the referral is to the side facing away from the skin, when the ostomy appliance is worn by a user. In other words, the proximal side is the side closest to the user, when the appliance is fitted on a user and the distal side is the opposite side—the side furthest away from the user in use.

The axial direction is defined as the direction of the stoma when the appliance is worn by a user. Thus, the axial direction is substantially perpendicular to the abdominal surface of the user.

The radial direction is defined as transverse to the axial direction that is transversely to the direction of the stoma.

When measuring the thickness of the laminate herein, the thickness is the distance from the proximal surface to the distal surface, measured perpendicular to the skin-facing proximal surface. The thickness is the combined thickness of the backing layer and the adhesive layer unless otherwise stated.

The invention relates to an adhesive ostomy product securing member comprising: a flexible arcuate laminate having a radial inner portion, a radial outer portion, and a proximal adhesive surface for securing the laminate simultaneously to the skin of an ostomate and to an ostomy flange; wherein the radial inner portion has a first thickness and the radial outer portion is provided with a pattern of discrete zones of a second thickness, the first thickness being smaller than the second thickness.

The base plate of an ostomy appliance forms a seal to the skin of a patient that surrounds the stoma and prevents leaks. The shape of a patient's body being curved and irregular means that it sometimes can be difficult to have the base plate fit tightly to the skin around a stoma. Furthermore, the skin may expand and contract with movement, causing the base plate to be stretched and distorted in use. This can result in failure of the seal between the base plate and the patient's skin, thereby introducing risk of leakage of stomal output creeping under the base plate and causing discomfort and embarrassment to the patient.

To cope with this problem, a securing member may be used, to provide additional security where required. Securing members are typically arc shaped flexible members, typically formed of a hydrocolloid adhesive laminate, and including an adhesive surface for securing in part to the patient and in part to the base plate. The semi-circular arc shape of the securing member is configured to sit over and overlap the outer edge of the base plate.

The pattern of discrete zones in the form of raised zones of enhanced thickness may have several advantages. The enhanced thickness provides a thicker layer of adhesive, and thereby an increased absorbing capacity of the adhesive in the outer portion of the member, being that portion of the securing member being outside the base plate when applied around the base plate of an ostomy appliance and thereby the portion being most exposed to moisture from leakage. The inner portion of the securing member, on the other hand, is thinner than the raised zones as it is placed over the base plate where a high absorbency is less needed. Furthermore, a thin inner portion reduces the combined thickness of the base plate and securing member and thereby facilitates a more flexible and less bulky device. By discrete zones are meant areas enhanced thickness where each zone is separated from the other zones by areas of the laminate having a thickness being thinner than the thickness of the discrete zones. The pattern of discrete zones may comprise at least two zones of enhanced thickness. In embodiments, the pattern comprises multiple zones of enhanced thickness.

The raised zones being arranged as discrete zones may provide more flexibility and stretchability to the securing member, thereby allowing the member to follow the movements of the body without introducing stress to the skin and thereby risk of detachment of the securing member and the base plate. Furthermore, the discrete zones provide a tactile sensation for the user during application as he/she is nudged to apply extra pressure over the raised zones and thereby a better attachment to the skin is facilitated.

Furthermore, when the adhesive absorbs moisture it swells and the raised zones may swell to connect to each other, thereby providing a tactile difference for the user who may be able to feel with his/her fingertips whether and where any leakage may occur.

In embodiments, the discrete zones of enhanced thickness are provided in the adhesive layer and on the distal side of the securing member, leaving the proximal surface of the adhesive layer generally flat and free from embossments. The backing layer may have the same thickness over the entire securing member and may follow the varying height of distal surface of the adhesive to provide an embossed distal surface of the laminate.

In embodiments, the laminate comprises a first end portion and a second end portion, wherein the pattern of raised zones is absent at end portions. This means that the end portions have an equal thickness. In embodiments, the thickness of the end portions corresponds to the thickness of the inner radial portion. The absence of the raised zones of the end portions facilitates that when two or more securing members are combined around a stoma base plate, any overlapping end portion will appear less bulky due to the reduced thickness.

In embodiments, the first end portion and the second end portion have third thickness, the third thickness being smaller than the first thickness. The reduced thickness of the end portions facilitates that when two or more securing members are combined around a stoma base plate, any overlapping end portion will appear less bulky due to the reduced thickness.

In embodiments, the pattern of discrete zones is in the form of radially extending lines or dots of enhanced thickness. This pattern may provide enhanced flexibility and stretchability of the securing member.

In embodiments, the pattern of discrete zones is in the form of lengthwise or arcuate extending lines of enhanced thickness. The lines may provide a better control of the stretching of the member during application. The lines may follow the arcuate shape of the securing member or they may extend lengthwise on the member in wave-shaped or linear form.

In embodiments, the proximal surface comprises a hydrocolloid adhesive. The hydrocolloid adhesive is absorbent and capable of absorbing moisture from leakage under the base plate.

In embodiments, the laminate comprises a backing film on the non-skin facing distal surface. The backing film provides a smooth non-stick surface against the clothes of the user.

In embodiments, the proximal adhesive surface is substantially planar. Such planar surface may provide a smooth and liquid tight fit to the skin and the base plate and decrease the risk of formation of channels under the adhesive.

In embodiments, the laminate comprises a release liner covering the adhesive surface of the laminate. In embodiments, the release liner comprises at least two parts. The release liner protects the proximal adhesive surface before application. Having a release liner in two or more parts may facilitate easier and more precise application of the securing member as the release liner part may be removed stepwise one by one during application. In embodiments, the release liner comprises a radially inner part and a radially outer part. During application the inner release part is first removed and applied to the base plate, then the outer part of the release liner is removed and the remainder part of the adhesive surface of the securing member is applied to the skin.

In embodiments, the adhesive securing member is beveled along the entire periphery. The beveled periphery provides a smooth transition to the surroundings and decreases the risk of the clothes catching the adhesive. In embodiments, the beveled periphery of the member has a fourth thickness being smaller than the first thickness.

When addressing the thickness of the laminate, hereunder the inner radial portion, the outer radial portion and the raised zones of enhanced thickness, the thickness is measured perpendicular to the skin-facing surface of the laminate and not at the beveled edge. Hence, the beveled edge portion is not considered a part of the raised zones of enhanced thickness.

In embodiments, the securing member spans a center angle of approximately 180 degrees. In embodiments, the securing member spans a center angle of approximately 120 degrees, such as 90 degrees or such as 60 degrees.

The width of the securing member is substantially equal over the entire laminate. The width is measured as the distance from an inner radial edge to an outer radial edge of the securing member, measured in radial direction.

In embodiments, the inner radial edge has constant radius. In embodiments, the outer radius has a constant radius.

In embodiments, the inner radial edge has constant radius, and the outer radius has a constant radius having the inner radial edge and the outer radial edge substantially parallel and the width of the securing member constant.

In embodiments, the end portions of the securing member may be rounded or have a more square configuration.

In embodiments, the adhesive securing member further comprises a first end portion and a second end portion, wherein the end portions have reduced thickness. The absence of raised pattern on the end portions facilitate an overlapping of securing members which may occur when using two or more members to secure the base plate.

The flexible laminate is a substantially planar laminate having a planar lower surface and wherein the lower surface is an adhesive surface. In other words, the raised portions of the radial outer portion occur in the distal portion of the member whereas the proximal skin-facing portion is planar without raised portions.

DETAILED DESCRIPTION OF THE DRAWING

Embodiments, and features of the various exemplary embodiments described in this application, may be combined with each other ("mixed and matched"), unless specifically noted otherwise.

FIG. 1 illustrates an embodiment of an adhesive ostomy product securing member 10 seen from the distal side, the securing member comprising a flexible arcuate laminate having a radial inner portion 20, a radial outer portion 30 and two end portions 40. The laminate 10 has an elongated arcuate shape with a two end portions located at each end of the elongated laminate. The laminate comprises a proximal adhesive layer 80 having a proximal adhesive surface for securing the laminate simultaneously to the skin of an ostomate and to an ostomy flange, the adhesive layer being covered on the distal surface by a backing layer 90. Apart from an optional beveling of the edge portion, shown in the figures as a broken line 100, the inner portion 20 of the distal surface of the laminate is generally flat and the inner portion 20 is of substantially equal thickness. The outer portion 30 of the distal surface of the laminate is provided with a pattern of discrete zones 50 separated by intermediate zones 60 of a lower thickness. The thickness of the discrete zones 50 is larger than the thickness of the inner portion 20. The thickness of the intermediate zones 60 may be equal to the thickness of the inner portion 20. In this embodiment, the discrete zones 50 defines an array of dots, arranged side by side at the outer portion 30. The discrete zones are extending to the edge of the outer portion 30 (apart from a beveled edge portion 70). The beveling along the edge portion comprises a sloping area 100 where the thickness of the laminate decreases gradually and a thin peripheral portion 110 of equal thickness, the thickness of the peripheral portion 110 being thinner or equal to the thickness of the inner radial portion.

Figure 2:
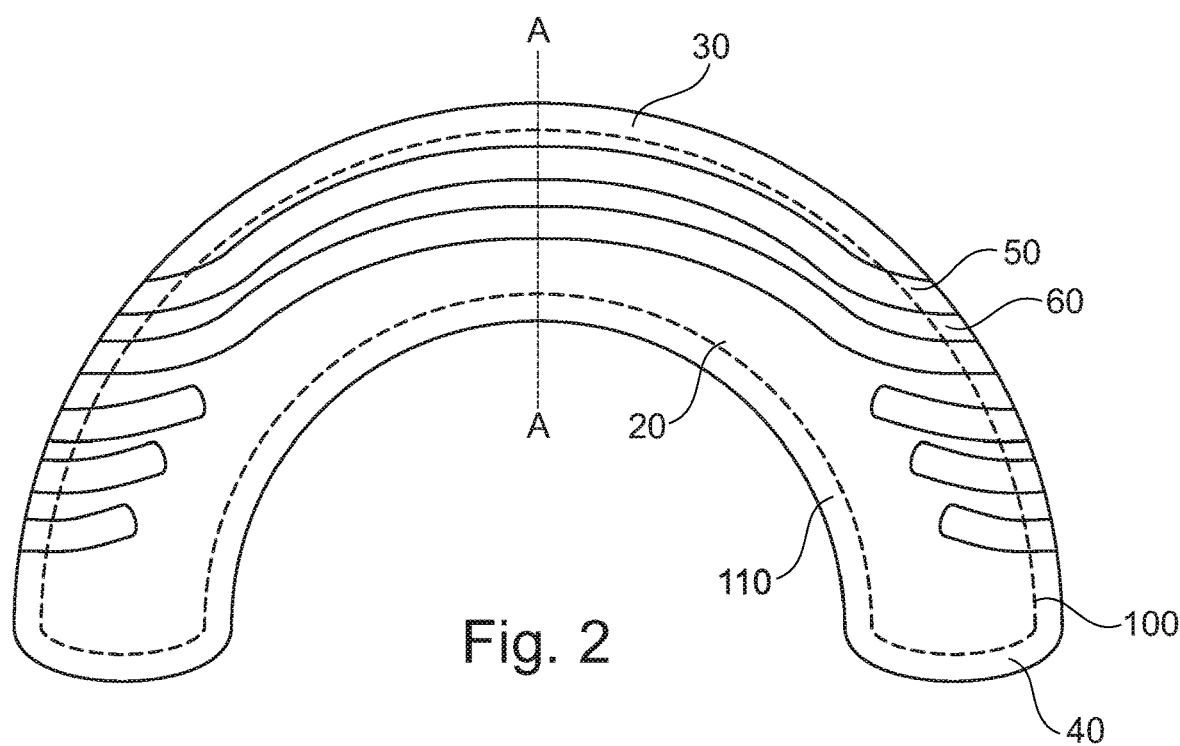
FIG. 2 illustrates another embodiment of the adhesive ostomy product securing member seen from above and FIG. 3 illustrates a cross-section of the embodiment of FIG. 2 in cross-section along the A-A line.

In FIG. 2 is disclosed another embodiment of an adhesive ostomy product securing member 10 seen from the distal side. In this embodiment, the discrete zones 50 are in the form of slightly curved lines, arranged lengthwise following the lengthwise arcuate shape of the securing member.

Figure 3:
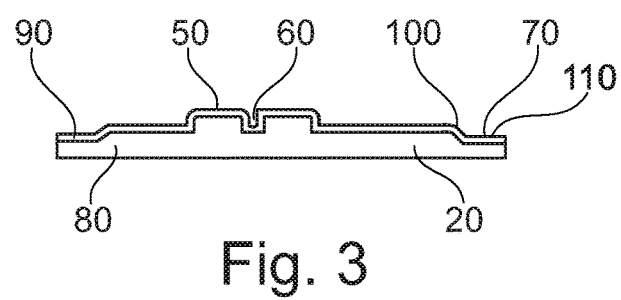

In FIG. 3 is shown a cross-section of the securing member of FIG. 2, along the A-A line. Along the edge portion 70, the securing member is beveled 100 to reduce the risk of adhesive sticking to the clothing of the user and thereby detaching the member. The discrete zones 50 on the outer portion 30 has a thickness being larger than the thickness of the inner portion 20. In the intermediate zones 60 between the discrete zones 50, the thickness is typically equal to the thickness of the inner portion 20. The discrete zones 50 of enhanced thickness are provided in the adhesive layer 80 and on the distal side of the securing member, leaving the proximal surface of the adhesive layer 80 generally flat and without embossments. The backing layer 90 has the same thickness all over the securing member and follows the varying height of distal surface of the laminate.

The invention claimed is:

1. An ostomy product adhesive securing member comprising: an arcuate laminate comprising an elongated arcuate shape with opposing end portions located at opposing ends of the elongated laminate, the laminate comprising a radial inner portion, a radial outer portion, and a proximal adhesive surface for securing the laminate simultaneously to the skin of an ostomate and to an ostomy flange; wherein the radial inner portion has a first thickness, and the radial outer portion is provided with a pattern of discrete zones having a second thickness, the first thickness being smaller than the second thickness, wherein the pattern of discrete zones is absent at the end portions.

2. The adhesive securing member according to claim 1, wherein the first end portion and the second end portion have a third thickness, the third thickness being smaller than the first thickness.

3. The adhesive securing member according to claim 1, wherein the pattern of discrete zones is in the form of radially extending dots or lines of enhanced thickness.

4. The adhesive securing member according to claim 1, wherein the pattern of discrete zones is in the form of lengthwise or arcuate extending lines of enhanced thickness.

5. The adhesive securing member according to claim 1, wherein the proximal adhesive surface comprises a hydrocolloid adhesive.

6. The adhesive securing member according to claim 1, wherein the laminate comprises a backing film on a facing distal surface.

7. The adhesive securing member according to claim 1, wherein the proximal adhesive surface is substantially planar.

8. The adhesive securing member according to claim 1, wherein the laminate comprises a release liner covering the proximal adhesive surface of the laminate.

9. The adhesive securing member according to claim 8, wherein the release liner comprises at least two parts.

10. The adhesive securing member according to claim 9, wherein the release liner comprises a radially inner part and a radially outer part.

11. The adhesive securing member according to claim 1, wherein the adhesive securing member is beveled along a periphery of the arcuate laminate.

12. The adhesive securing member according to claim 11, wherein the beveled periphery of the arcuate laminate has a fourth thickness being smaller than the first thickness.

\* \* \* \* \*